(12) United States Patent
Fouilloy et al.

(10) Patent No.: US 6,177,671 B1
(45) Date of Patent: Jan. 23, 2001

(54) INFRARED TELESCOPE WITH HARMONIZATION OF THE INPUT AND OUTPUT AXES

(75) Inventors: Jean-Pierre Fouilloy, Velizy; Patrick Seugnet, Chatillon, both of (FR)

(73) Assignee: Thomson-CSF, Paris (FR)

( * ) Notice: Under 35 U.S.C. 154(b), the term of this patent shall be extended for 0 days.

(21) Appl. No.: 09/197,703

(22) Filed: Nov. 23, 1998

(30) Foreign Application Priority Data

Nov. 21, 1997 (FR) .................................................. 97 14646

(51) Int. Cl.$^7$ ....................................................... G01J 1/04
(52) U.S. Cl. ........................... 250/330; 359/350; 359/353
(58) Field of Search ........................... 250/330; 359/350, 359/353, 399, 400

(56) References Cited

U.S. PATENT DOCUMENTS

| | | |
|---|---|---|
| 3,989,947 | 11/1976 | Chapman . |
| 4,397,429 | 8/1983 | Fouilloy . |
| 4,639,082 * | 1/1987 | Loy ....................... 350/172 |
| 4,761,652 | 8/1988 | Pirolli et al. . |
| 4,811,061 * | 3/1989 | Sud et al. ............................... 356/152 |
| 4,881,796 * | 11/1989 | Michika et al. ...................... 350/166 |
| 5,073,704 * | 12/1991 | Encaoua ............................. 250/201.1 |
| 5,084,780 * | 1/1992 | Phillips ................................. 359/350 |
| 5,149,969 | 9/1992 | Fouilloy et al. . |
| 5,212,384 | 5/1993 | Fouilloy . |
| 5,387,933 | 2/1995 | Fouilloy et al. . |
| 5,402,168 | 3/1995 | Fouilloy . |
| 5,629,797 * | 5/1997 | Tchejeyan ............................. 356/153 |

FOREIGN PATENT DOCUMENTS

| | | |
|---|---|---|
| 36 01 763 | 7/1987 | (DE) . |
| 2 575 280 | 6/1986 | (FR) . |
| 2 661 517 | 10/1991 | (FR) . |
| 2 661 518 | 10/1991 | (FR) . |
| 2 727 755 | 6/1996 | (FR) . |
| 1 603 144 | 11/1981 | (GB) . |
| 2 148 663 | 5/1985 | (GB) . |

* cited by examiner

Primary Examiner—Constantine Hannaher
Assistant Examiner—Albert Gagliardi
(74) Attorney, Agent, or Firm—Oblon, Spivak, McClelland, Maier & Neustadt, P.C.

(57) ABSTRACT

An infrared telescope, an apparatus for the harmonizing of its input and output axes including an infrared camera enabling the observation of an infrared scene and delivering a video signal representing the infrared scene, the infrared camera having a sighting axis that constitutes the input axis; a display screen receiving the video signal and displaying the corresponding image in the visible frequency spectrum; a bispectral, visible and infrared collimator, collimating the image displayed on the display screen at infinity, the collimator having an optical axis that constitutes the output axis; an infrared source positioned in a predefined way with respect to the output axis and positioned so that its radiation is collimated at infinity by the collimator; an element the reflection of the radiation coming from the infrared source at output of the collimator towards the infrared camera, the element enabling the formation on the display screen of an image of the infrared source; a device to measure the shift between the predefined position of the infrared source and the image of the infrared source on the display screen; and a device adjusting the telescope to reduce the shift.

10 Claims, 2 Drawing Sheets

INFRARED TELESCOPE WITH HARMONIZATION OF THE INPUT AND OUTPUT AXES

BACKGROUND OF THE INVENTION

1. Field of the Invention

The invention relates to an infrared telescope comprising means to harmonize its input and output axes. It may be recalled that the telescope is a device used to observe a distant scene. The telescope gives an image of the scene at infinity. By analogy, an infrared telescope enables the observation of an infrared scene and gives an image thereof that is visible at infinity.

Many sighting systems such as for example a gun sighting device, a laser telemeter or a missile firing station use a telescope working in the visible light spectrum. This telescope, called a day telescope, defines an axis by means of a reticule. It may be necessary to make these sighting systems work in a frequency spectrum other than the visible spectrum, such as for example the infrared spectrum. A usual frequency band of the infrared spectrum ranges for example between about three and five $\mu$m. Another band commonly used in the infrared spectrum is located approximately between eight and twelve $\mu$m. The invention of course is not limited to these frequency bands. To make these sighting systems work at such frequencies, advantageous use is made of an infrared telescope with a magnification of unity. The infrared telescope is placed before this day telescope.

2. Description of the Prior Art

Embodiments of this type of telescope exist but they nevertheless have a particular difficulty. It is indeed important to harmonize the input and output optical axes of the infrared telescope in such a way that an observer can look at the same scene with or without the infrared telescope. In particular, the aiming axis defined by the reticule of the day telescope must be preserved when an infrared telescope is placed before this day telescope. In the particular case of an infrared telescope placed before the day telescope, the input and output axes of the infrared telescope have to be parallel. Harmonizing the input and output axes of a telescope of this kind implies reducing possible defects of parallelism of these axes, ideally so as to cancel these defects or, at least, to bring them within acceptable tolerances. The invention of course is not limited to a telescope comprising parallel axes. It can also be implemented for a telescope whose input and output axes are not parallel. Harmonizing axes, in this case, means limiting their defects of relative position.

The example of an infrared telescope with a magnification of unity has being chosen for a better understanding of the problem raised, but it is clear that the invention is not limited to this type of telescope. The invention can be implemented for any type of telescope whatever its magnification.

It is an aim of the invention to harmonize the input and output axes of the telescope with a precision that is compatible with the application envisaged. This precision may, for example, be lower than 100 $\mu$rd.

SUMMARY OF THE INVENTION

To achieve this goal, an object of the invention is an infrared telescope comprising:

- an infrared camera enabling the observation of an infrared scene and delivering a video signal representing the infrared scene, said infrared camera having a sighting axis that constitutes the input axis,
- a display screen receiving the video signal and displaying the corresponding image in the visible frequency spectrum,
- a bispectral, visible and infrared collimator, collimating the image displayed on the display screen at infinity, said collimator having an optical axis that constitutes the output axis,
- an infrared source positioned in a predefined way with respect to the output axis and positioned so that its radiation is collimated at infinity by the collimator,
- means for the reflection of the radiation coming from the infrared source at output of the collimator towards the infrared camera, said means enabling the formation on the display screen of an image of the infrared source,
- means to measure the shift between the predefined position of the infrared source and the image of the infrared source on the display screen,
- means for adjusting the telescope to reduce the shift.

One advantage related to the invention is that it enables the harmonizing of the axes to be done in a simple way. This implementation can be done during operation. It is not necessary to place the telescope on a measuring stand in the factory in order to harmonize the axes.

BRIEF DESCRIPTION OF THE DRAWINGS

The invention will be understood more clearly and other advantages shall appear from the following description and from the appended drawings, of which.

MORE DETAILED DESCRIPTION

With a view to simplicity in the different figures, the same objects bear the same topological references.

Figure 1:
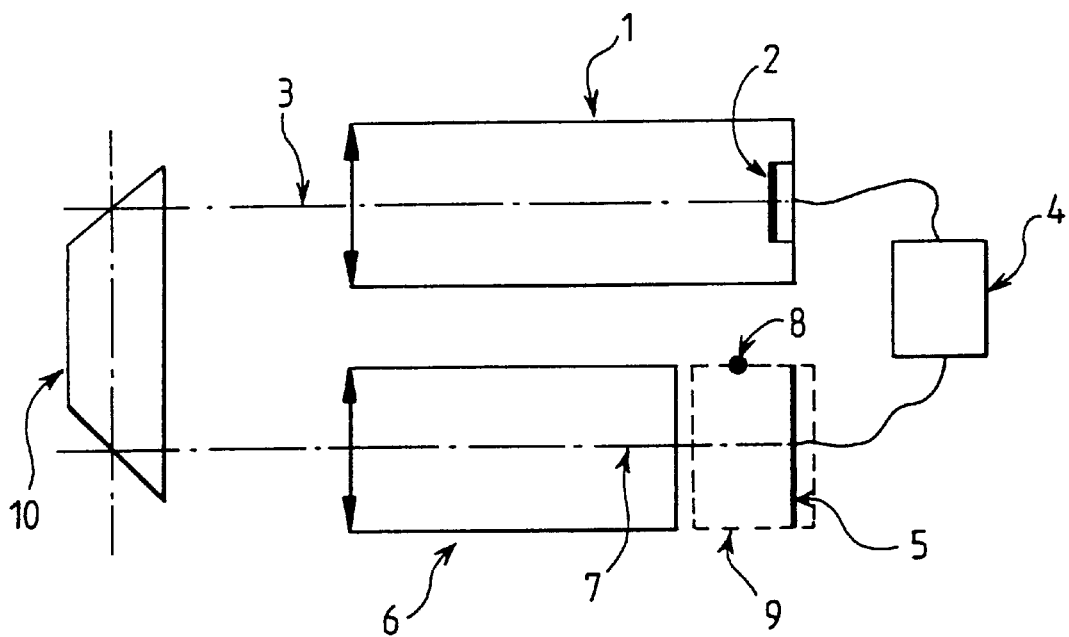
FIG. 1 gives a schematic view of an embodiment, according to the invention, of an infrared telescope comprising means for the harmonizing of its input and output axes.

FIG. 1 shows the general principle of harmonization of the input axis 3 and output axis 7 of an infrared telescope with a magnification of unity, these two axes being parallel. The infrared telescope has an infrared camera 1 whose sighting axis is the input axis 3, a display screen 5 and a collimator 6 whose optical axis constitutes the output axis 7. A light ray coming out of the telescope along the output axis 7 has a direction opposite the direction of a ray entering along the input axis 3. It is clear that the invention is not limited to this configuration and that it can be implemented in any telescope, whatever the relative position of the input and output axes. However, this type of configuration is advantageously used in combination with a day telescope not shown in this figure. The two telescopes, namely the day telescope and the infrared telescope, are positioned in such a way that their input axes are substantially parallel and oriented in the same direction. To insert the infrared telescope in the optical path of the day telescope, a reflection means is interposed between the output axis 7 of the infrared telescope and the input axis of the day telescope. This means comprises, for example, a set of plane mirrors in the form of an open tri-rectangular trihedron. This known reflection means has the advantage of sending back any incoming light ray, whatever its incidence, in a direction parallel to itself.

The camera 1 has a detector 2 whose role is to convert an infrared radiation entering the camera into a video electrical signal. In FIG. 1, the camera 1 is oriented in such a way that the input axis 3 is horizontal and that an infrared radiation can enter the camera 1 from the left to the right. The video signal coming from the detector 2 is transmitted to a processing electronic device 4 that converts it into a signal that can be displayed on the display screen 5. The display screen 5 displays an image in the visible spectrum. This image shows an infrared scene observed by the camera 1. The display screen 5 for example may be a liquid crystal screen or a LED screen. The image displayed, on the display screen 5, is collimated at infinity by means of a collimator 6 in a direction opposite the direction of the infrared radiation entering the camera 1.

The collimator 6 is bispectral. It can be used both in the visible spectrum and in the infrared spectrum. It will be understood that the collimator 6 is capable of being used in the visible spectrum since it must achieve the collimation at infinity of the image in the visible spectrum displayed on the display screen 5. The use of the collimator in the infrared spectrum is made necessary by the fact that the device which is the object of the present invention comprises an infrared source 8, which is preferably a substantially pinpoint source. This infrared source 8 is positioned in a predefined way with respect to the output axis 7 of the collimator 6.

Furthermore, the infrared source 8 is positioned in such a way that its radiation is collimated at infinity by the collimator 6. Advantageously, the infrared source is in a place located between the display screen 5 and the collimator 6. Two exemplary means 9 for positioning the infrared source 8 shall be described here below by means of FIGS. 2 and 3.

The telescope furthermore comprises means 10 for the reflection of the radiation coming from the infrared source 8, at output of the collimator 6, towards the infrared camera 1. These reflection means 10 are preferably detachable. They are required only in the phase of harmonizing the input optical axis 3 and output optical axis 7 of the infrared telescope. These reception means 10 are for example a known assembly of plane mirrors in the form of an open tri-rectangular trihedron.

Through the camera 1, its detector 2 and the electronic device 4, the radiation thus reflected, coming from the infrared source 8, forms an image on the display screen 5. To harmonize the input and output axes of the infrared telescope, the shift between the predefined position of the infrared source 8 and its image on the display screen 5 is measured. Then, the telescope is adjusted. This adjustment is done ideally in order to cancel the shift or at least to reduce it so as bring it within acceptable tolerances. The adjustment is done, for example, by acting mechanically on one or more optical components of the infrared telescope or on the position of the display screen 5. It is also possible for example to work on the electronic device 4 to reduce the off-centering. Once the operation to harmonize the input axis 3 and the output axis 7 is over, the infrared source 8 is turned off and it is possible to remove the reflection means 10 from the image if they hamper the use of the infrared telescope.

It has been seen here above that the infrared source 8 should be positioned in a predefined way with respect to the output axis 7 of the collimator 6. If the telescope has a magnification of unity, the position of the infrared source 8 with respect to the output axis 7 is of no importance. Indeed, any shift between the predefined position of the infrared source 8 and its image on the display screen 5 is independent of the position of the infrared source 8 with respect to the output axis 7 of the collimator. It is nevertheless advantageous to position the infrared source 8 in the vicinity of the output axis 7 in order to prevent the harmonization effect from being added up with other defects such as for example geometrical distortions, offaxis aberrations or vignetting defects, which may appear with distance from the output axis 7. If, on the contrary, the magnification of the telescope is different from 1, it is advantageous that the infrared source 8 should be positioned on the output axis 7. Indeed, in this case, the shift is not only a function of a defect of harmonization of the axes 3 and 7 but also of the position of the infrared source 8 with respect to the output axis 7.

Figure 2:
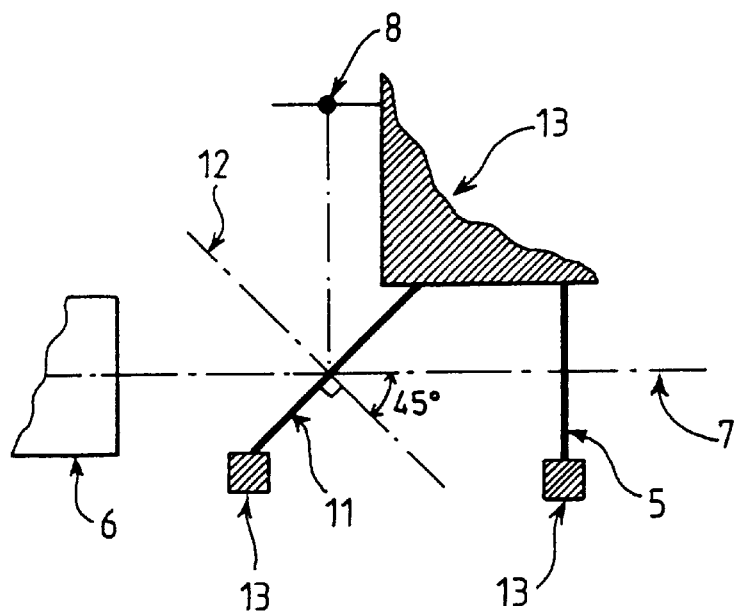
FIG. 2 is a schematic view of a means for positioning the infrared source of the previous figure in such a way that its radiation is collimated at infinity, the display screen being already on the axis of the collimator.

FIG. 2 describes a first example of means for positioning the infrared source 8 in such a way that its radiation is collimated at infinity.

The axis 7 of the collimator 6 is represented horizontally. The display screen 5 is perpendicular to the axis 7. A plane dichroic mirror 11 is positioned between the display screen and the collimator 6. A straight line 12 perpendicular to this mirror 11 is substantially oriented at 45° with respect to the axis 7. The mirror is transparent to the light radiation of the visible frequency spectrum and is reflective to the light radiation of the infrared spectrum so that it is capable of reflecting a light ray coming from the infrared source 8. The 45° orientation of the mirror 11 is of course given only by way of an example. Other orientations are possible provided that the infrared source 8 is positioned in such a way that it sends out infrared radiation which, after reflection on the mirror 11, is collimated along the axis 7 of the output objective 6. It has been seen here above that the collimator 6 collimates the image displayed on the display screen 5 at infinity. The infrared source 8 is positioned so that the infrared radiation that it sends is also collimated at infinity through the collimator 6.

In order that the collimator 6 may collimate the image displayed on the display screen 5 and the radiation emitted by the infrared source 8 at infinity, the display screen 5 and the infrared source 8 should be in the vicinity of the focal plane of the collimator 6, namely the focal plane sent back by the mirror 11 for the infrared source 8. It is possible for the focal distances of the collimator 6 in the visible spectrum and in the infrared spectrum to be different. One advantage related to the structure described in FIG. 2 is that it is possible to position the infrared source 8 as precisely as possible in the infrared focal plane. This would be difficult without the mirror 11 if the infrared focal distance should be greater than the visible focal distance; For, it would be necessary to have the infrared source 8 behind the display screen 5.

A mechanical structure 13 holds the display screen 5, the infrared source 8 and the mirror 11 in position. This mechanical structure 13 is advantageously as compact as possible and is made of material carefully chosen so that the relative position of the different elements that it holds together and, to a lesser extent, the position of this structure with respect to the output objective 6, are as stable as possible as a function of the conditions of the environment of the telescope.

An exemplary embodiment of the infrared source 8 may comprise a hole with a diameter of 20 μm in a plate behind which a halogen lamp is placed.

Figure 3:
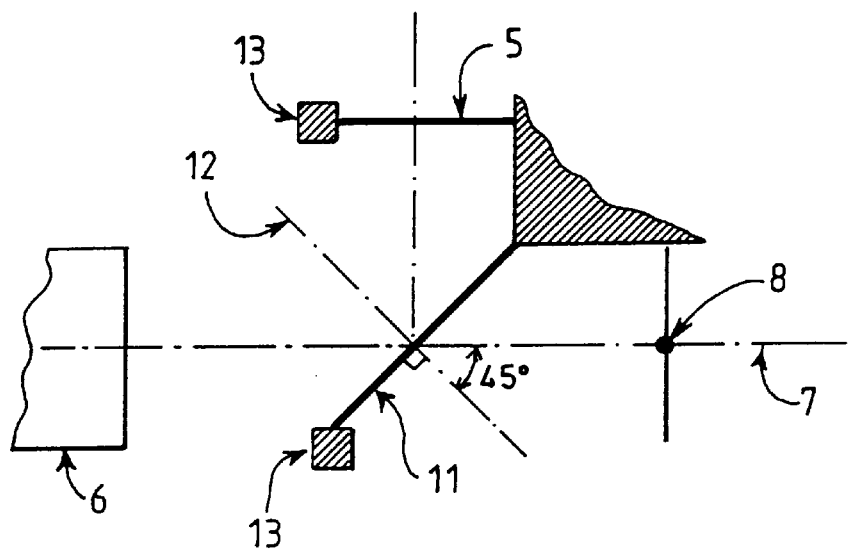
FIG. 3 gives a schematic view of another means to position the infrared source in such a way that its radiation is collimated at infinity, the infrared source being already on the axis of the collimator.

FIG. 3 describes a second exemplary means to position the infrared source 8 in such a way that its radiation is collimated at infinity. The principle is similar to the one described in FIG. 2 but this time the dichroic mirror 11 is transparent to the radiation of the infrared spectrum and is reflective with respect to the radiation of the visible spectrum. This structure of the mirror 11, with respect to FIG. 2, causes a reversal of the infrared source 8 and the display screen 5. This variant has all the advantages described here above but it may be preferred in order to improve the accessibility of the infrared source 8 in the mechanical structure of the telescope.

Another advantage related to the invention is that the measurement of the shift is done directly by the electronic device 4 by comparing the predefined position of the infrared source 8 relative to the position of the output axis 7 with the position of the image of the infrared source 8 that the camera 1 gives on the display screen 5. Thus, the system is independent of the technology chosen for the display screen 5. Indeed, certain screens, such as for example a liquid display screen, do not radiate in a lobe that is symmetrical with respect to the axis 7. Positioning a detector, for example a four-quadrant detector, to measure the shift in the vicinity of the display screen 5 would entail the risk of giving an erroneous piece of information on the real position of the image of the infrared source 8 that the camera I gives on the display screen 5.

In order to determine the predefined position of the infrared source 8 with respect to the output axis 7, there are several existing methods. One exemplary method consists in observing the telescope through the collimator 6 either directly or by replacing the collimator 6 with the tube of a microscope. The infrared source 8 and a point of the display screen 5 located on the output axis 7 are lit up. This point is lit up by means of the electronic device 4. In observing the telescope, two images can be seen, that of the infrared source 8 and that of the lit point. Then, these two images are made to coincide for example by shifting the infrared source. This method ensures that the infrared source 8 is properly located on the output axis 7. It is then enough to use the invention to harmonize the input axis 3 and the output axis 7 of a telescope.

Another method to determine the predefined position of the infrared source 8 consists in harmonizing the telescope on a measuring stand in the factory. Then, the infrared source 8 is lit and the reflection means 10, if they are detachable, are positioned in such a way that they reflect the radiation coming from the infrared source 8 to the camera 1. The radiation induces an image on the display screen 5. This image is normally a substantially pinpoint image. If the image is not a substantially pinpoint image, for example because the diffraction has an effect on the pupil defined by the mirror 10 for the reflection of the image, then the center of gravity of the image is taken into consideration. This is the center of gravity that can be determined by the electronic device 4. Then, the coordinates of this image are memorized in the electronic device 4. So long as the telescope is harmonized, the image of the infrared source 8 displayed on the display screen 5 through the collimator 6, the reflection means 10 and the camera 1 coincide with the position initially memorized in the electronic device 4. At a later stage, when it is sought to harmonize the telescope again, for example during operation, the infrared source 8 will be lit up and the reflection means 10 will be positioned, and a new position of the infrared source 8 on the display screen 5 will be noted. If this new position coincides with the initially memorized position, then the telescope is accurately harmonized. If, on the contrary, a shift is measured between the new position and the initial measured position, the telescope is harmonized, ideally by canceling the shift or at least by reducing it to bring it within acceptable tolerances.

What is claimed is:

1. An infrared telescope comprising:

an infrared camera enabling the observation of an infrared scene and delivering a video signal representing the infrared scene, said infrared camera having a sighting axis that constitutes the input axis, a display screen receiving the video signal and displaying the corresponding image in the visible frequency spectrum, a bispectral, visible and infrared collimator, collimating the image displayed on the display screen at infinity, said collimator having an optical axis that constitutes the output axis, an infrared source positioned in a predefined way with respect to the output axis and positioned so that its radiation is collimated at infinity by the collimator, means for the reflection of the radiation coming from the infrared source at output of the collimator, towards the infrared camera, said means enabling the formation on the display screen of an image of the infrared source, means to measure the shift between the predefined position of the infrared source and the image of the infrared source on the display screen, means for adjusting the telescope to reduce the shift.

2. A telescope according to claim 1, further comprising a dichroic mirror placed on the output axis between the display screen and the collimator, reflecting the radiation of the infrared source towards the collimator.

3. A telescope according to claim 2, wherein the dichroic mirror is transparent to the visible radiation and reflects the infrared radiation.

4. A telescope according to claim 2, wherein the dichroic mirror is transparent to the infrared radiation and reflects the visible radiation.

5. A telescope according to claim 1, wherein the infrared source is positioned substantially on the output axis or on the reflection of the output axis by the mirror.

6. A telescope according to claim 1, wherein the telescope has substantially a magnification of unity.

7. A telescope according to claim 1, wherein the input axis and the output axes are substantially parallel.

8. A telescope according to claim 1, wherein the reflection means comprise a set of plane mirrors in the form of an open tri-rectangular trihedron.

9. A telescope according to claim 1, wherein the infrared source is a substantially pinpoint source.

10. A telescope according to claim 1, wherein the measurement means determine the center of gravity of the image of the infrared source on the display screen.

* * * * *